(12) United States Patent
Shirakawa

(10) Patent No.: US 7,252,849 B2
(45) Date of Patent: Aug. 7, 2007

(54) PERFUME COMPOSITION AND PROCESS FOR PRODUCING THE SAME

(75) Inventor: Toshifumi Shirakawa, Noda (JP)

(73) Assignee: Soda Aromatic Co., Ltd. (JP)

( * ) Notice: Subject to any disclaimer, the term of this patent is extended or adjusted under 35 U.S.C. 154(b) by 125 days.

(21) Appl. No.: 10/296,669

(22) PCT Filed: Apr. 25, 2002

(86) PCT No.: PCT/JP02/04163

§ 371 (c)(1),
(2), (4) Date: Nov. 26, 2002

(87) PCT Pub. No.: WO02/100989

PCT Pub. Date: Dec. 19, 2002

(65) Prior Publication Data

US 2003/0157228 A1    Aug. 21, 2003

(30) Foreign Application Priority Data

Jun. 8, 2001   (JP) ............................. 2001-174777

(51) Int. Cl.
*A23L 1/22*   (2006.01)
*A23L 2/56*   (2006.01)

(52) U.S. Cl. .................. 426/536; 426/538; 426/580

(58) Field of Classification Search ............... 426/534, 426/580, 536, 538
See application file for complete search history.

(56) References Cited

U.S. PATENT DOCUMENTS 4,280,011 A * 7/1981 DeSimone .............. 568/603
4,609,492 A * 9/1986 Hata et al. ............... 512/26
6,063,410 A * 5/2000 Vedamuthu et al. ........ 426/56

FOREIGN PATENT DOCUMENTS

JP        58059908 A   *  4/1983

JP        59-116247 A      7/1984

OTHER PUBLICATIONS

L.G. Wade, Jr., Orgainc Chemistry, 1987, Prentice-Hall, Inc., p. 1004.*

* cited by examiner

*Primary Examiner*—Arthur L. Corbin
(74) *Attorney, Agent, or Firm*—DLA Piper US LLP

(57) ABSTRACT

The invention relates to a flavoring composition having a better milk-like flavor and a process for producing the composition. The composition comprises a 5-alkenoic acid and/or a 6-alkenoic acid both represented by general formula (1) and a lower aliphatic aldehyde having not greater than 8 carbon atoms:

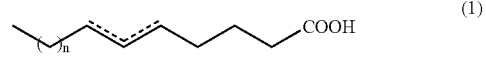

(1)

wherein n is an integer of from 1 to 4, and the dashed line represents the presence of a carbon-carbon double bond at either side. The composition may further comprise a δ-lactone represented by general formula (2) and/or a γ-lactone represented by general formula (3):

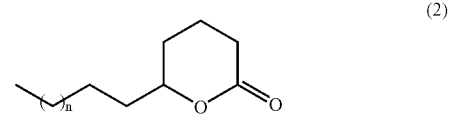

(2)

wherein n is an integer of from 1 to 4; and

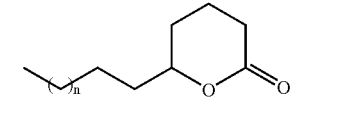 (3)

wherein n is an integer of from 1 to 4.

22 Claims, No Drawings

PERFUME COMPOSITION AND PROCESS FOR PRODUCING THE SAME

TECHNICAL FIELD

The present invention relates to a flavoring composition comprising a 5-alkenoic acid and/or a 6-alkenoic acid and a lower aldehyde, and also relates to a process for producing the composition.

BACKGROUND ART

Up to now, 2-, 3-, 4- and ω-alkenoic acids and lower esters thereof have been known as flavoring materials.

The present inventors, on the other hand, have been proposed that a 5-alkenoic acid (see Japanese Unexamined Patent Application Publication No. 58-96014) and a trans-6-alkenoic acid (see Japanese Examined Patent Application Publication No. 1-40877) are useful as flavoring materials and that a 5-alkenoic acid butyl ester and/or a 6-alkenoic acid butyl ester (see Japanese Examined Patent Application Publication No. 6-14846) have a milk-like flavor.

The inventors have made intensive and extensive studies for developing another flavoring materials for dairy products. As a result, the inventors have found that a mixture of a 5-alkenoic acid and/or 6-alkenoic acid and a lower aliphatic aldehyde is a good flavoring material, and have accomplished the invention.

DISCLOSURE OF THE INVENTION

Accordingly, it is an object of the present invention to provide a flavoring composition having a milk-like flavor which comprises 5-alkenoic acid and/or 6-alkenoic acid.

It is an another object of the present invention to provide a process for producing the flavoring composition having a milk-like flavor.

The flavoring composition according to the present invention comprises a 5-alkenoic acid and/or a 6-alkenoic acid both represented by general formula (1) and a lower aliphatic aldehyde having not greater than 8 carbon atoms:

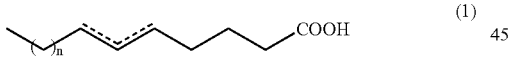
(1)

wherein n is an integer of from 1 to 4, and the dashed line represents the presence of a carbon-carbon double bond at either side.

According to the present invention, use of the above-mentioned components enables to provide a flavoring composition having a better milk-like flavor.

In the present invention, the composition may further comprise a δ-lactone represented by general formula (2) and/or a γ-lactone represented by general formula (3) to provide a flavoring composition having a further better milk-like flavor:

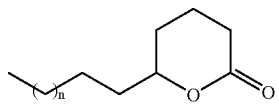
(2)

wherein n is an integer of from 1 to 4; and

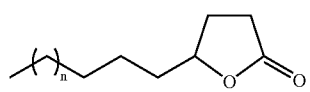
(3)

wherein n is an integer of from 1 to 4.

According to the present invention, it is found that the 5-alkenoic acid and/or the 6-alkenoic acid both represented by general formula (1) may be subjected to aging to produce a lower aliphatic aldehyde having not greater than 8 carbon atoms, thereby providing a flavoring composition having a richly milk-like flavor:

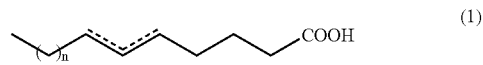
(1)

wherein n is an integer of from 1 to 4, and the dashed line represents the presence of a carbon-carbon double bond at either side.

In the aging process, it is also found that a δ-lactone represented by general formula (2) and/or a γ-lactone represented by general formula (3) may be added to the 5-alkenoic acid and/or the 6-alkenoic acid represented by general formula (1) to generate a lower aliphatic aldehyde having not greater than 8 carbon atoms, whereby a flavoring composition having a richly milk-like flavor can also be provided:

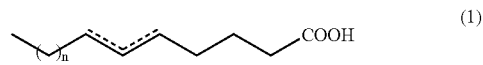
(1)

wherein n is an integer of from 1 to 4, and the dashed line represents the presence of a carbon-carbon double bond at either side;

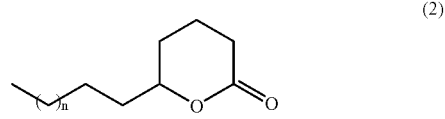
(2)

wherein n is an integer of from 1 to 4; and

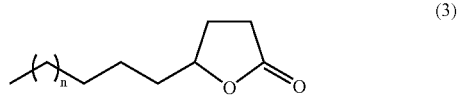
(3)

wherein n is an integer of from 1 to 4.

THE BEST MODES FOR CARRYING OUT THE INVENTION

It has been already known that a 5-alkenoic acid and/or a 6-alkenoic acid are useful as flavoring materials having a milk-like flavor. As a result of the further extensive studies, the present inventors have found that addition of a small amount of a lower aliphatic aldehyde having not greater than 8 carbon atoms to the 5-alkenoic acid and/or the 6-alkenoic acid can impart a milder milk-like flavor which is closer to the natural milk flavor to the resulting composition. It has been also found that addition of a proper amount(s) of a δ-lactone and/or a γ-lactone to the composition can further improve the milk-like flavor of the composition.

The alkenoic acid used in the present invention is a compound represented by general formula (1) above, specifically 5-noneonic acid, 6-noneonic acid, 5-decenoic acid, 6-decenoic acid, 5-undecenoic acid, 6-undecenoic acid, 5-dodecenoic acid and 6-dodecenoic acid. The 5-alkenoic acid or 6-alkenoic acid may be used singly or in combination. Preferably a mixture of both alkenoic acids is used, because the flavor characteristics close to the natural milk flavor can be enhanced. The 5-alkenoic acid and the 6-alkenoic acid are preferably mixed at a ratio ranging from 7/3 to 3/7, more preferably from 6/4 to 4/6.

In the structure of the 5-alkenoic acid or the 6-alkenoic acid, the carbon-carbon double bond may be in cis- or trans configuration. For each alkenoic acid, the trans isomer is preferably present at a proportion of not smaller than 55%, more preferably not smaller than 80%. The proportion of the trans isomer may be 100%. The more trans isomer in the composition, the more enhanced milk-like flavor can be achieved.

The alkenoic acid used in the invention can be prepared according to the conventional methods. For example, the method described in Bull. Soc. Chim. France, 1964 (4), 723 utilizes the Ramberg-Backlund reaction, in which a cyclopentanone or a cyclohexanone is used as a starting material to produce a 5-alkenoic acid or a 6-alkenoic acid, respectively.

In the method described in the Journal of Pharmacy, 75, 606, 1955, methyl 6-bromodecanoate is dehydrobrominated to produce a mixture of methyl 5-decenoate and methyl 6-decenoate, the mixture is then hydrolyzed to give a 1/1 mixture of 5-decenoic acid and 6-decenoic acid.

The lower aliphatic aldehyde used in the present invention preferably has not greater than 8 carbon atoms. Specific-examples include acetaldehyde, propionaldehyde, butylaldehyde, pentylaldehyde, hexylaldehyde, heptylaldehyde and octylaldehyde. Commercially available lower aliphatic aldehydes may also be used in the present invention. The lower aliphatic aldehyde may be used singly or in combination at any ratio. Use of even a very small amount of the lower aliphatic aldehyde can provide a sufficient effect. The lower aliphatic aldehyde is used in an amount of not more than 1% by weight, preferably within the range from 0.1 to 0.01% by weight, based on the total weight of the 5- and/or 6-alkenoic acid and the δ- and/or γ-lactone. It is found that incorporation of such a very small amount of the lower aliphatic aldehyde to the composition can provide a milk-like flavor that is milder and quite close to the natural milk flavor. If the content of the lower aliphatic aldehyde in the composition exceeds the above-mentioned range, the flavor of the composition tends to be degraded organoleptically.

The δ-lactone and γ-lactone used in the present invention are common formulation additives represented by the above-indicated general formula (2) and (3), respectively, and commercially available products may be used. The δ-lactone and γ-lactone may be mixed singly with the 5- and/or 6-alkenoic acid. However, use of both the lactones in combination is preferred, because the properties of both lactones are provided and flavor characteristics close to those of the natural milk flavor can be enhanced.

Specific examples of the δ- and γ-lactones include δ- and γ-nonalactone, δ- and γ-decalactones, δ- and/or γ-undecalactone and δ- and/or γ-dodecalactone.

The ratio between the 5- and/or 6-alkenoic acid and the δ- and/or γ-nonalactone contained in the composition is preferably from 98/2 to 10/90 by weight, more preferably from 90/10 to 30/70 by weight.

In the present invention, addition of a very small amount of the lower aliphatic aldehyde having not greater than 8 carbon atoms to the 5- and/or 6-alkenoic acid may be achieved by any of the following means:

(a) the lower aliphatic aldehyde which is provided separately is added to the 5- and/or 6-alkenoic acid; and (b) the 5- and 6-alkenoic acid is aged to produce such a lower aliphatic aldehyde in the reaction system which is then utilized in the reaction.

In the means (b), the δ- and/or γ-lactone may be co-present during the aging process for the 5- and/or 6-alkenoic acid. In this manner, in the present invention, the lower aliphatic aldehyde may be provided to the reaction system by the aging of the 5- and/or 6-alkenoic acid.

In the present invention, the aging of the 5- and/or 6-alkenoic acid may be achieved by storing the reaction system for a long period of time at room temperature or under heated conditions. Preferably, however, the aging is achieved by heating the reaction system for a predetermined period of time while stirring. The aging temperature is preferably within the range from 20 to 80° C., more preferably from 40 to 60° C.

The aging time may vary, depending on the amount of the 5- and/or 6-alkenoic acid, the apparatus used for the aging, the effectiveness of the stirring, the aging temperature and so on. It is preferred that the aging be generally performed for several hours to several tens hours, while checking the odor or taste of the reaction product organoleptically so as to avoid the excess proceeding of the aging. The aging product thus produced may be subjected to further aging process in the conventional manner at room temperature, thereby giving a flavoring material having a more enhanced milk-like flavor.

If the aging proceeds too excessively, the content of the lower aldehyde is increased and the odor of the aldehyde is also increased undesirably, causing degradation of milk-like flavor.

The flavoring composition of the present invention comprising a mixture of the 5- and/or 6-alkenoic acid and the lower aliphatic aldehyde, which optionally may contain the δ- and/or γ-lactone, is generally added to a product to be flavored in an amount of 0.1 to 50% by weight based on the weight of the product, depending on the intended use.

The flavoring composition can be used as a flavoring material in the fields where such type of a flavoring material is commonly used. For example, the flavoring composition is suitable as a flavoring material for dairy products, particularly as a base milk flavoring and a base cream flavoring in which a milk-like flavor is essential, as well as a flavoring material for cookies, candies, biscuits and so on which are produced through a heating process.

EXAMPLES

The present invention will be described in great detail in the following examples. However, these examples are not intended to limit the invention.

Reference Example 1

Process for Producing 5-Noneonic Acid a) Synthesis of 2-Butylthiocyclopentanone

Absolute ethanol (600 ml) was added with metal sodium (13.8 g) and butylmercaptan (64.8 g). A solution of 2-chlorocyclopentane (71.1 g) in absolute ethanol (600 ml) was added to the mixture and then was allowed to stand overnight at a low temperature. The ethanol was removed from the mixture, and the residue was dissolved in ether. The resulting solution was neutralized with aqueous acetic acid solution, the solvent was evaporated, and the resultant was then subjected to distillation, thereby giving 2-buthylthiocyclopentanone (90 g).

b) Synthesis of 2-Butylsulfonylcyclopentanone

2-Buthylthiocyclopentanone (88 g) was reacted with a 30% excess solution of mono-perphthalic acid in ether at 0° C. After the reaction was completed, the excess mono-perphthalic acid was treated with sodium sulfite, and the resultant solution was washed, evaporated to remove the solvent, and then distilled, thereby giving 2-butylsulfonyl-cyclopentanone (78 g).

c) Synthesis of 5-Buromo-5-butylsulfonylpentanoic Acid

2-Butylsulfonylcyclopentanone (10.2 g) was added dropwise with a solution of sodium hydride (0.055 mol) in benzene at 60° C. When the generation of hydrogen was ended, bromine (8.8 g) was added dropwise to the reaction solution at 0° C., and then stirred at 0° C. for 30 minutes. The reaction solution was treated with 2N potassium hydroxide (120 ml) at 0° C. for 30 minutes. The aqueous phase was neutralized with 12% HCl, extracted with ether, washed, and then evaporated to remove the solvent. The residue was recrystallized with ethyl acetate and cyclohexane, thereby giving 5-bromo-5-butylsulfonylpentanoic acid (8.6 g).

d) Synthesis of 5-Noneonic Acid

5-Bromo-5-butylsulfonylpentanoic acid (6 g) was added with 2N potassium hydroxide (60 ml), and the mixture was allowed to react at 100° C. for 2 hours. The reaction solution was cooled to 0° C., neutralized with 12% HCl, extracted with ether, washed, ant then evaporated to remove the solvent. The residue was distilled, thereby giving 5-noneonic acid (2 g).

Reference Example 2

Process for Producing 6-Decenoic Acid

Substantially the same procedure as in Reference Example 1 was performed, except for using 2-chlorocyclohexanone in place of 2-chlorocyclopentanone, thereby giving 6-decenoic acid.

Reference Example 3

Process for Producing 5-Decenoic Acid and 6-Decenoic Acid e) Synthesis of Ethyl 6-Oxodecanoate A mixture of activated zinc-copper catalyst (11.5 g), butyl acetate (4 g), toluene (5 g), butyl iodide (15 g) and iodine (3 mg) was heated at 110-120° C. for 2 hours. The mixture was then added dropwise with adipic acid monoethyl ester chloride(15.7 g) at 0° C., and then was allowed to react. After the reaction was completed, ice-cooled water was added to the reaction solution, and then decomposed with dilute sulfuric acid. The oily layer was extracted with ether, washed with aqueous sodium hydrogencarbonate, washed with water, and then dried. The residue was evaporated to remove the solvent, and then distilled, thereby giving ethyl 6-oxodecanoate (8.1 g).

f) Synthesis of 6-Oxodecanoic Acid

Ethyl 6-oxodecanoate (4 g) was saponified in a conventional manner, and the resultant substance was recrystallized with ethanol and petroleum ether, thereby giving 6-oxodecanoic acid (2.7 g).

g) Synthesis of 6-Hydroxydecanoic Acid

Hydrogen (198.2 ml) was absorbed in a mixture of 6-oxodecanoic acid (1.86 g), platinum oxide (0.5 g) and glacial acetic-acid (30 ml) over 35 hours. The resultant solution was filtered to remove glacial acetic acid, and the residue was recrystallized with ethanol and water, thereby giving 6-hydroxydecanoic acid (1.7 g).

h) Synthesis of Methyl 6-Bromodecanoate

Methyl 6-hydroxydecanoate (2.3 g), which was produced by converting 6-hydroxydecanoic acid into a methyl ester form in a conventional manner, and aqueous hydrogen bromide (28 ml) were stirred in a closed tube at 105-110° C. for 6 hours. The resultant solution was extracted with ether and transferred in aqueous sodium hydrogencarbonate. The mixture was reacted with diazomethane, washed, dried, evaporated to remove the solvent, and then distilled, thereby giving methyl 6-bromodecanoate (0.95 g).

i) Synthesis of 5-Decenoic Acid and 6-Decenoic Acid

Methyl 6-bromodecanoate (1.2 g) and quinoline (1.2g) were mixed together, and then allowed to react at 240° C. for 5 minutes. After the reaction was completed, the reaction solution was extracted with ether, washed with dilute sulfuric acid, washed with water, dried, evaporated to remove the solvent, and then distilled, thereby giving a mixture of methyl 5-decenoate and methyl 6-decenoate (310 mg). The mixture was hydrolyzed in a coventional manner, thereby giving a mixture (270 mg) of 5-decenoic acid and 6-decenoic acid (1/1).

Example 1

The following materials (A) and (B) were prepared separately: (A) a mixture of 5-decenoic acid (trans/cis=85/15) and 6-decenoic acid (trans/cis=85/15) (1/1, by weigh); and (B) a product produced by aging the mixture (A) at 50° C. for 24 hours, in which the production of 0.03 part by weight of propionaldehyde, butylaldehyde, pentylaldehyde and hexylaldehyde (1/4/4/1, by weight) was confirmed. Each of these materials (each 10 parts by weight) was added to a base milk flavoring (990 parts by weight) which has the following formulation, to give two kinds of compositions.

Each of the compositions was organoleptically evaluated by 10 panel members. All of the panel members were evaluated that the composition containing the material (B) had a flavor closer to the natural milk flavor and was therefore better compared with the composition containing the material (A).

| <Formulation of base milk flavoring (by weight)> | |
|---|---|
| Dimethyl sulfide | 0.1 |
| Diacetyl | 2.0 |
| Butyl butyrate | 2.5 |
| Acetoin | 15.0 |
| Butyric acid | 0.4 |
| Caprylic acid | 20.0 |
| Maltol | 5.0 |
| γ-Octalactone | 10.0 |
| δ-Decalactone | 15.0 |
| δ-Dodecalactone | 20.0 |
| Glycerol | 200.0 |
| Ethyl alcohol | 700.0 |
| | 990.0 |

Example 2

The following mixtures (A), (B) and (C) were prepared separately: (A) a mixture of 5-decenoic acid and 6-decenoic acid (1/1, by weight; trans/cis=9/1); (B) a mixture of 5-decenoic acid and 6-decenoic acid (1/1, by weight; trans/cis=9/1) and δ-decalactone at a mixing ratio of 85/15; and (C) the same mixture as the mixture (B) further containing 0.03% by weight of a mixture of butylaldehyde and pentylaldehyde (1/1, by weight). Each of the mixtures was organoleptically evaluated by 10 panel members. All of the panel members were evaluated that the mixture (B) had a flavor closer to the natural milk flavor and was therefore better than the mixture (A) and the mixture (C) had a flavor closer to the natural milk flavor and was therefore better than the mixture (B).

Example 3

Substantially the same procedure was performed, except that an aged product, which was produced by heating the mixture (B) at 50° C. for 24 hours while stirring, was used in place of the mixture (C). Each of the mixtures was organoleptically evaluated by 10 panel members. The same result as in Example 2 was obtained.

Example 4

The following material (A) and mixtures (B) and (C) were prepared separately: (A) 6-dodecenoic acid (trans/cis=8/2); (B) a mixture of 6-dodecenoic acid (trans/cis=8/2) and δ-dodecalactone and γ-dodecalactone (9/1, by weight) at a mixing ratio of 8/2; and (C) the same mixture as the mixture (B) further containing 0.05% by weight of a mixture of propionaldehyde, butylaldehyde, pentylaldehyde and hexylaldehyde (1/4/4/1, by weight).

Each of the material and mixtures was organoleptically evaluated by 10 panel members. All of the panel members were evaluated that the mixture (B) had a sweeter flavor closer to the natural milk flavor and was therefore better than the material (A) and the mixture (C) had a sweeter flavor closer to the natural milk flavor and was therefore better than the mixture (B).

Example 5

The following mixtures (A), (B) and (C) were prepared separately: (A) a mixture of 5-noneonic acid and 6-noneonic acid (1/1, by weight; trans/cis =9/1); (B) a mixture of 5-noneonic acid and 6-noneonic acid (1/1, by weight; trans/cis=9/1) and δ-decalactone and δ-dodecalactone (2/8, by weight) at a mixing ratio of 1/1; and (C) the same mixture as the mixture (B) further containing 0.04% by weight of a mixture of butylaldehyde and pentylaldehyde (1/1, by weight).

Each of the mixtures was organoleptically evaluated by 10 panel members. All of the panel members were evaluated that the mixture (B) had a more creamy flavor and was therefore better than the mixture (A) and the mixture (C) had a more creamy flavor and was therefore better than the mixture (B).

Example 6

A mixture of 5-decenoic acid (trans/cis =85/15) and 6-decenoic acid (trans/cis=85/15) (1/1, by weight) was prepared. Before and after heating (aging) at 50° C. for 24 hours, the mixture was organoleptically evaluated by 10 panel members. All of the panel members were evaluated that the heated mixture had a flavor closer to the natural milk flavor and was therefore better than the unheated mixture. The heated (aged) mixture was analyzed and revealed that 0.04% by weight of propionaldehyde, butylaldehyde, pentylaldehyde and hexylaldehyde were produced (1/4/4/1, by weight).

Example 7

Using the same mixture as in Example 6, an unheated sample and an heated (aged) sample which was produced by heating the mixture at 50° C. for 24 hours were provided. Each of the samples (each 10 parts by weight) was added to a base butter flavoring (990 parts by weight) which has the following formulation, thereby giving two kinds of compositions.

Each of the compositions was organoleptically evaluated by 10 panel members. All of the panel members were evaluated that the butter-characteristic flavor of the composition containing the heated (aged) mixture was enhanced and therefore closer to the natural butter flavor than that of the composition containing the unheated (unaged) sample.

| <Formulation of base butter flavoring (by weight)> | |
|---|---|
| Ethyl acetate | 2 |
| Acetoin | 15 |
| Diacetyl | 7 |
| 2-Heptanone | 4 |
| 2-Nonanone | 10 |
| 2-Undecanone | 4 |
| Butyric acid | 40 |
| 2-Tridecanone | 6 |
| Caproic acid | 18 |
| δ-Octalactone | 3 |
| Caprylic acid | 25 |
| δ-Decalactone | 10 |
| δ-Undecalactone | 5 |
| Capric acid | 6 |
| δ-Dodecalactone | 35 |
| Purified vegetable oil | 800 |
| | 990 |

INDUSTRIAL APPLICABILITY

According to the present invention, a flavoring composition having a milder milk-like flavor close to the natural milk flavor can be produced by blending a 5-alkenoic acid or a 6-alkenoic acid with a small amount of a lower aliphatic aldehyde. Further addition of a lactone to the flavoring composition can enhance the milk-like flavor of the composition. The addition of such a small amount of the lower aliphatic aldehyde may be achieved by aging of the composition.

The flavoring composition according to the present invention is suitable as a flavoring material for dairy products, particularly as a base milk flavoring and a base cream flavoring in which a milk-like flavor is essential, as well as a flavoring material for cookies, candies, biscuits and so on which are produced through a heating process.

The invention claimed is:

1. A composition having a mild milk flavor consisting essentially of a 5-alkenoic acid and/or a 6-alkenoic acid both represented by general formula (1) and a lower aliphatic aldehyde having not greater than 8 carbon atoms:

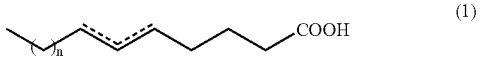
(1)

wherein n is an integer of from 1 to 4, and the dashed line represents the presence of a carbon-carbon double bond at either side.

2. The mild milk flavor composition according to claim 1, further comprising a δ-lactone represented by general formula (2) and/or a γ-lactone represented by general formula (3):

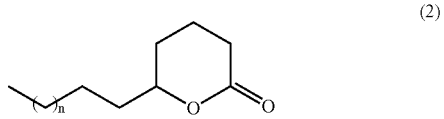
(2)

wherein n is an integer of from 1 to 4; and

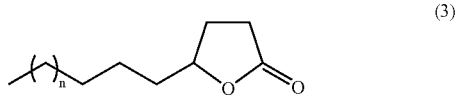
(3)

wherein n is an integer of from 1 to 4.

3. The mild milk flavor composition according to claim 2, wherein the 5- and/or 6-alkenoic acid and the δ- and/or γ-lactone are contained at a ratio of from 98/2 to 10/90 by weight.

4. The mild milk flavor composition according to claim 3, wherein the lower aliphatic aldehyde is contained in an amount of 0.01% -1% by weight based on the total weight of the 5- and/or 6-alkenoic acid and the δ- and/or γ-lactone.

5. The mild milk flavor composition according to claim 2, wherein the lower aliphatic aldehyde is contained in an amount of 0.01% -1% by weight based on the total weight of the 5- and/or 6-alkenoic acid and the δ- and/or γ-lactone.

6. The mild milk flavor composition according to claim 2, wherein the 5-alkenoic acid and the 6-alkenoic acid is contained at a ratio of from 7/3 to 3/7 by weight.

7. The mild milk flavor composition according to claim 2, wherein the lower aliphatic aldehyde is contained in an amount of 0.01% -1% by weight based on the total weight of the 5- and/or 6-alkenoic acid and the δ- and/or γ-lactone.

8. The mild milk flavor composition according to claim 1, wherein the 5-alkenoic acid and the 6-alkenoic acid is contained at a ratio of from 7/3 to 3/7 by weight.

9. The mild milk flavor composition according to claim 8, wherein the 5- and/or 6-alkenoic acid and the δ- and/or γ-lactone are contained at a ratio of from 98/2 to 10/90 by weight.

10. The mild milk flavor composition according to claim 8, wherein the lower aliphatic aldehyde is contained in an amount of 0.01% -1% by weight based on the total weight of the 5- and/or 6-alkenoic acid and the δ- and/or γ-lactone.

11. A dairy product comprising the mild milk flavor composition as claimed in claim 1.

12. A process for producing a composition having a mild milk flavor, comprising aging a 5-alkenoic acid and/or a 6-alkenoic acid, both represented by general formula (1), by storing the acid or acids for a selected period of time at 40°-80° C. to produce a composition consisting essentially of a lower aliphatic aldehyde having not greater than 8 carbon and the acid or acids atoms:

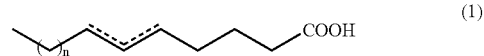
(1)

wherein n is an integer of from 1 to 4, and the dashed line represents the presence of a carbon-carbon double bond at either side.

13. The process for producing a composition according to claim 12, wherein the aging process is performed at a temperature within the range from 20° C. to 80° C.

14. A process for producing a mild milk flavor composition, comprising aging a mixture of a 5-alkenoic acid and/or a 6-alkenoic acid, both represented by general formula (1), and a δ-lactone represented by general formula (2) and/or a γ-lactone represented by general formula (3) by storing the acid or acids and the lactone or lactones for a selected period of time at 40°-80° C. to produce a composition consisting essentially of a lacetones lower aliphatic aldehyde having not greater than 8 carbon atoms the acid or acids and the lactone or:

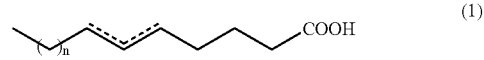
(1)

wherein n is an integer of from 1 to 4, and the dashed line represents the presence of a carbon-carbon double bond at either side:

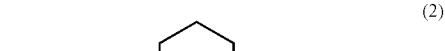
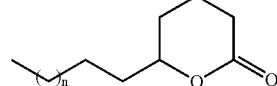
(2)

wherein n is an integer of from 1 to 4; and

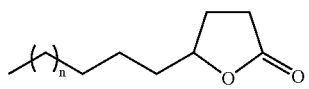
(3)

wherein n is an integer of from 1 to4.

15. A flavoring composition consisting essentially of a 5-alkenoic acid and/or a 6-alkenoic acid, both represented by general formula (1), and an amount of a lower aliphatic aldehyde having not greater than 8 carbon atoms effective to impart a milder milk flavor than the 5-alkenoic acid or the 6-alkenoic acid alone:

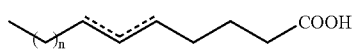
(1)

wherein n is an integer of from 1 to 4, and the dashed line represents the presence of a carbon-carbon double bond at either side.

16. The flavoring composition according to claim 15, further comprising a δ-lactone represented by general formula (2) and/or a γ-lactone represented by general formula (3):

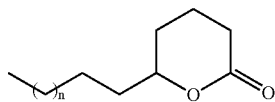
(2)

wherein n is an integer of from 1 to 4; and

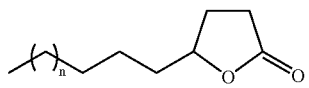
(3)

wherein n is an integer of from 1 to 4.

17. The flavoring composition according to claim 16, wherein the 5- and/or 6-alkenoic acid and the δ- and/or γ-lactone are contained at a ratio of from 98/2 to 10/90 by weight.

18. The flavoring composition according to claim 16, wherein the lower aliphatic aldehyde is contained in an amount of 0.01% -1% by weight based on the total weight of the 5- and/or 6-alkenoic acid and the δ- and/or γ-lactone.

19. The flavoring composition according to claim 15, wherein the 5-alkenoic acid and the 6-alkenoic acid is contained at a ratio of from 7/3 to 3/7 by weight.

20. A dairy product comprising a flavoring composition as claimed in claim 15.

21. A process for producing a flavoring composition, comprising aging a 5-alkenoic acid and/or a 6-alkenoic acid, both represented by general formula (1), by storing the acid or acids for a selected period of time at 40°-80° C. to produce a composition consisting essentially of the acid or acids and an amount of a lower aliphatic aldehyde having not greater than 8 carbon atoms effective to impart a milder milk flavor than the 5-alkenoic acid or the 6-alkenoic acid alone:

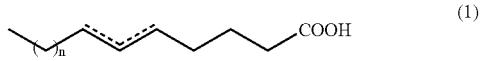
(1)

wherein n is an integer of from 1 to 4, and the dashed line represents the presence of a carbon-carbon double bond at either side.

22. A process for producing a flavoring composition, comprising aging a mixture of a 5-alkenoic acid and/or a 6-alkenoic acid, both represented by general formula (1), and a δ-lactone represented by general formula (2) and/or a γ-lactone represented by general formula (3) by storing the acid or acids and the lactone or lactones for a selected period of time at 40°-80° C. to produce an amount of a lower aliphatic aldehyde having not greater than 8 carbon atoms effective to impart a milder milk flavor than the 5-alkenoic acid or the 6-alkenoic acid alone:

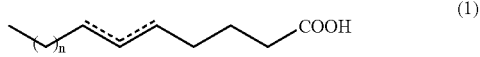
(1)

wherein n is an integer of from 1 to 4, and the dashed line represents the presence of a carbon-carbon double bond at either side:

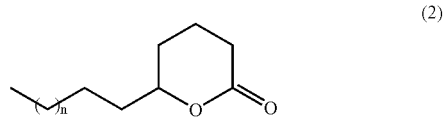
(2)

wherein n is an integer of from 1 to 4; and

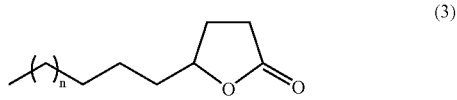
(3)

wherein n is an integer of from 1 to 4.

* * * * *

UNITED STATES PATENT AND TRADEMARK OFFICE
CERTIFICATE OF CORRECTION

PATENT NO.         : 7,252,849 B2
APPLICATION NO.    : 10/296669
DATED              : August 7, 2007
INVENTOR(S)        : Toshifumi Shirakawa It is certified that error appears in the above-identified patent and that said Letters Patent is hereby corrected as shown below:

In Column 10

At line 24, please insert --atoms-- after "carbon" and delete "atoms" after --acids--; at line 44, please delete "lacetones"; and at line 45, please insert --,-- after "atoms"; and at line 46, please insert --lactones-- after "or".

Signed and Sealed this

Sixth Day of May, 2008

JON W. DUDAS
*Director of the United States Patent and Trademark Office*